United States Patent
Auweder et al.

(10) Patent No.: US 9,945,284 B2
(45) Date of Patent: Apr. 17, 2018

(54) THERMOSTATIC VALVE WITH A RESTRICTION ELEMENT AND BYPASS PORT ARRANGED BETWEEN A FIRST INLET CONNECTION AND A FIRST OUTLET CONNECTION

(71) Applicant: MAHLE International GmbH, Stuttgart (DE)

(72) Inventors: Andreas Auweder, Vaihingen/Enz (DE); Stefan Beurer, Simmozheim (DE)

(73) Assignee: MAHLE International GmbH, Stuttgart (DE)

( * ) Notice: Subject to any disclaimer, the term of this patent is extended or adjusted under 35 U.S.C. 154(b) by 339 days.

(21) Appl. No.: 14/521,887

(22) Filed: Oct. 23, 2014

(65) Prior Publication Data
US 2015/0108229 A1    Apr. 23, 2015

(30) Foreign Application Priority Data
Oct. 23, 2013  (DE) .................. 10 2013 221 574

(51) Int. Cl.
*F25B 41/04*    (2006.01)
*F25B 41/06*    (2006.01)
(Continued)

(52) U.S. Cl.
CPC .............. *F01P 7/165* (2013.01); *G05D 23/02* (2013.01); *G05D 23/1333* (2013.01); *F01P 7/026* (2013.01); *F01P 7/16* (2013.01)

(58) Field of Classification Search
CPC ... F01P 7/16; F01P 7/165; F01P 7/026; F01M 5/007; G05D 23/02; G05D 23/1333; F24D 2220/0257
(Continued)

(56) References Cited

U.S. PATENT DOCUMENTS 2,754,062 A * 7/1956 Von Wangenheim ....... G05D 23/022
137/493
4,189,095 A * 2/1980 Monigold ............... F01P 7/044
137/529
(Continued)

FOREIGN PATENT DOCUMENTS

DE    296 19 609 U1    1/1997
DE    101 29 933 A1    1/2003
(Continued)

*Primary Examiner* — Frantz Jules
*Assistant Examiner* — Daniel C Comings
(74) *Attorney, Agent, or Firm* — Muncy, Geissler, Olds & Lowe, P.C.

(57) ABSTRACT

A thermostatic valve to connect a heat source, in particular a gear drive, with a heat exchanger, particularly a motor vehicle. The thermostatic valve having a thermostatic valve housing with a first inlet connection for a first inlet port and a second inlet connection for a second inlet port, as well as a first outlet connection for a first outlet port and a second outlet connection for a second outlet port. The thermostatic valve further including a moveable working element in an intake opening of the thermostatic valve housing to open and close the inlet and outlet ports and a separate restriction element provided in the thermostatic valve housing between the first inlet connection and the first outlet connection.

12 Claims, 5 Drawing Sheets

(51) Int. Cl.
*G05D 23/12* (2006.01)
*G05D 23/02* (2006.01)
*G05D 23/08* (2006.01)
*F01P 7/16* (2006.01)
*G05D 23/13* (2006.01)
*F01P 7/02* (2006.01)

(58) Field of Classification Search
USPC .............................................. 236/92 B, 93 R
See application file for complete search history.

(56) References Cited

U.S. PATENT DOCUMENTS

| | | | |
|---|---|---|---|
| 5,791,557 A | 8/1998 | Kunze | |
| 6,702,054 B2 | 3/2004 | Schneider et al. | |
| 7,165,513 B2 | 1/2007 | Humburg | |
| 8,123,143 B2 | 2/2012 | Willers et al. | |
| 2005/0098644 A1* | 5/2005 | Ap | B60H 1/02 237/12.3 B |
| 2006/0016900 A1 | 1/2006 | Brown et al. | |
| 2007/0164123 A1* | 7/2007 | Willers | G05D 23/1333 236/93 R |
| 2009/0173798 A1* | 7/2009 | Mabboux | F03G 7/06 236/93 R |

FOREIGN PATENT DOCUMENTS

| | | |
|---|---|---|
| DE | 103 23 900 A1 | 1/2005 |
| DE | 10 2005 011 754 A1 | 10/2006 |
| DE | 10 2005 057 702 A1 | 6/2007 |
| DE | 10 2006 061 510 A1 | 6/2008 |
| DE | 10 2009 012 534 A1 | 9/2010 |
| DE | 10 2011 114 308 A1 | 3/2013 |
| EP | 1 814 009 A1 | 8/2007 |
| GB | 2 309 075 A | 7/1997 |
| GB | 2394277 A * | 4/2004 ............. F01P 7/165 |

* cited by examiner

THERMOSTATIC VALVE WITH A RESTRICTION ELEMENT AND BYPASS PORT ARRANGED BETWEEN A FIRST INLET CONNECTION AND A FIRST OUTLET CONNECTION

This nonprovisional application claims priority to German Patent Application No. DE 10 2013 221 574.6, which was filed in Germany on Oct. 23, 2013, and which is herein incorporated by reference.

BACKGROUND OF THE INVENTION

Field of the Invention

The present invention relates to a thermostatic valve for a cooling system as well as a cooling system with a thermostatic valve, in particular for a motor vehicle.

Description of the Background Art

Thermostatic valves are known in the conventional art and are typically utilized in a cooling system of a liquid-cooled combustion engine, in particular a motor vehicle to control a coolant cycle with the objective to reach the optimal temperature in the combustion engine as soon as possible, to maintain it under all operating conditions and to prevent an overheating in the motor. This is of particular importance for the lifespan, fuel consumption and the development of exhaust fumes of the combustion engine. As a rule, the thermostatic valve is utilized as a 2/2 directional valve in the coolant cycle, if the engine temperature is too low after the start or if the pressure is too low during the driving of the motor vehicle. Due to the thermostatic valve the coolant streaming from the engine does not flow through a radiator of the coolant cycle, but immediately back to the engine via a bypass line.

Thermostatic valves, particularly thermostatic valves designed as 4/2 directional valves, are utilized as transmission fluid thermostats to regulate an oil temperature of a gear drive, for example automatic transmissions in the motor vehicle. The shifting ease can be especially improved for automatic transmissions, the wear of the gear drive can be reduced and a decrease of the temperature fluctuations of the transmission fluid can be achieved. This can result in a longer usability of the transmission fluid. Ultimately, fuel savings can be achieved in the popular driving cycles.

From the DE 10 2005 057 702 A1 a cooling arrangement is known with a thermostatic valve to monitor and/or adjust a coolant temperature. The cooling arrangement has a heat exchanger and a heat source with the heat source arranged in a coolant flow path as well as a bypass flow path to circumvent the heat exchanger. The thermostatic valve has a flow restrictor to control the volume flow of the coolant and a sensor to gauge the temperature of the coolant. The flow restrictor is for example designed as a disk valve or annular slide valve and is moveable as a function of the sensed temperature to clear a flow path to the heat exchanger.

The DE 10 2009 012 534 A1 shows a self-adjusting thermostatic valve to change a flow quantity of a fluid through a runner as a function of the temperature of the fluid. The thermostatic valve is arranged in a cooling system for a combustion engine. Here the flow quantity is automatically minimized when the fluid has a predetermined nominal temperature. The thermostatic valve also increases the flow quantity upon an increasing deviation from the nominal temperature, at which the flow quantity increases and decreases again approximately in proportion to the deviation from the nominal temperature, when the temperature of the fluid approaches the nominal temperature.

The DE 10 2011 114 308 A1 relates to a valve arrangement with at least two valves connected to a joint feeder line, wherein a first one of the valves is arranged as a return valve in a first line branching off of one of the feeder lines, and a second one of the valves as a thermally controlled thermostatic valve in a second line branching off of the feeder line. The return valve permits a flow only from the direction of the feeder line. It is so designed that a control element accessing the thermostatic valve is arranged in or at an intersection of the first line and the second line.

SUMMARY OF THE INVENTION

It is therefore an object of the present invention to provide a thermostatic valve that is optimized with respect to its capacity when compared to the most recent background art.

An exemplary embodiment provides a thermostatic valve to connect a heat source, in particular a gear drive with a heat exchanger, particularly of a motor vehicle, having a thermostatic valve housing with a first inlet connection for a first inlet port and a second inlet connection for a second inlet port as well as a first outlet connection for a first outlet port and a second outlet connection for a second outlet port, with a moveable working element provided in an intake port of the thermostatic valve housing to open and close the intake and outlet ports and a separate restriction element provided in the thermostatic valve housing between the first intake connection and the first outlet connection.

The thermostatic valve can be a 4/2 directional valve. Here, the separate restriction element is not connected to the moveable working element, in particular, it is not mechanically connected to it. The separate restriction element can be designed particularly static and is not moveable opposite the thermostat housing. Here, the separate restriction element can form a throttle section for a medium flowing through the inlet port, particularly fluid. The fluid can be a fluid of the heat source, for example the oil of a gear drive. During operation the medium, for example fluid coming from the heat source, can flow through the first inlet connection and the first inlet port into the thermostatic valve. If the temperature of the medium flowing in exceeds a threshold value, the thermostatic valve opens to the second outlet port and the medium can flow into the heat exchanger, is cooled there and flows back via the second inlet connection into the thermostatic valve and through the first outlet connection into the heat source. The separate restriction element provided in the thermostat housing allows a fluid connection between the first inlet port and the first outlet port, particularly when the thermostatic valve is closed. Here in particular, a buildup of pressure and/or a pressure decrease can be controlled via the separate restriction element.

The separate restriction element can have a recess, in particular a groove in the thermostatic valve housing. Here, the groove is constructed on a section of the housing wall of the thermostat housing, which is primarily running parallel to the traverse path of the moveable working element. The groove can have different geometrical dimensions, for example slit shaped, square, rectangular or round, and oval. The groove can also be angular, to wit, it can be constructed of two rectangular partial grooves.

In an embodiment of the thermostatic valve a bypass port can be provided between the first inlet port and the first outlet port. If the medium has a high temperature the bypass port can be closed via the temperature sensitive moveable working element.

The restriction element can be arranged between the first inlet port and the bypass port. Here, the separate restriction element can permit a buildup of pressure in the bypass port and thereby avoid a decrease of pressure in the cooling circuit.

In another embodiment or in addition, the restriction element can be arranged between the bypass port and the first outlet connection.

The arrangement of the first inlet connection and the second outlet connection in an axial direction can be at a different height of the thermostat housing.

The bypass port can be closed when an upper temperature threshold value is reached or exceeded. Such threshold values can be determined for each thermostatic valve through a travel temperature characteristic curve and can represent a break point in the characteristic curve diagram where the slope of the characteristic curve changes.

It can be provided in the thermostatic valve that the working element has a cap piece with the cap piece of the working element weighed with a spring element forcing the working element into a position where the connection between the bypass port and the first outlet port is open. The spring element can be a return spring arranged between a lower cap piece section and a housing section located on the opposite side of it.

In addition, a power discharge element can be provided in the thermostatic valve.

The object is also solved with a cooling system, in particular for a motor vehicle with a cooling circuit and a heat source, particularly a gear drive as well as at least one heat exchanger, wherein an above thermostatic valve connects the heat source, in particular the gear drive, with the heat exchanger. The heat exchanger can be an oil/air cooler or an oil/water cooler.

Through the arrangement of the separate restriction element directly in the thermostat housing an increased loss of pressure can be generated and adjusted to the normal level for the medium flow with low temperature from the heat source via the bypass port and back to the heat source. If the temperature of the medium, for example oil, rises, an expansion element of the working element will expand and a cap piece of the working element will move in axial direction towards a control edge. This will at first occur slowly in accordance with a travel temperature characteristic curve. A travel of 3 mm can be generated with a temperature increase from 30° C. to 80° C. At this time the second outlet port to the heat exchanger is still closed. From a further temperature increase on and, with that, a greater travel, the working element will partially open the second outlet port and the medium flow can take place in the direction of the heat exchanger. The groove of the restriction element can be designed so that the loss of pressure can adjust to a typical value and the typical level of the medium flow from the heat source via the bypass port and back again. This prevents a decrease of pressure which could interrupt the flow of the medium and therefore could lead to an interruption of the oil flow in the gear drive, which could be disadvantageous for the life span and the wear and tear of the gear drive. The travel temperature characteristic curve stands out in that it can show during low temperatures of the medium, for example, the fluid, the start of the opening to the bypass port and then during increasing temperatures of the medium, particularly fluids, a flat progression until the opening of the second outlet port via the control edge to the heat exchanger. This marks the beginning of the mixed mode where the medium flow, via the bypass port as well as via the heat exchanger, can get back again to the heat source, for example the gear drive. Here, the travel temperature characteristic curve is steeper. If the temperature of the medium continues to rise the thermostatic valve is opened completely and so is the second outlet port, with the bypass port closed. With that, a greater cooling capacity can be achieved for the medium and an overheating of the medium can be prevented.

An easy installation is realized through the integral fitting of the separate restriction element into the thermostatic valve housing. In comparison to the technology known in most recent background art no additional restriction element is necessary in a line of the cooling system. Additional interfaces which might be susceptible to faults such as leaks can be foregone. The installation and, with that, the production of the thermostatic valve in the cooling system is simplified since an additional installation step can be omitted. All in all, a smaller installation space has been realized for the thermostatic valve with a separate restriction valve, and the complete unit of thermostatic valve and restriction element has a lower weight.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
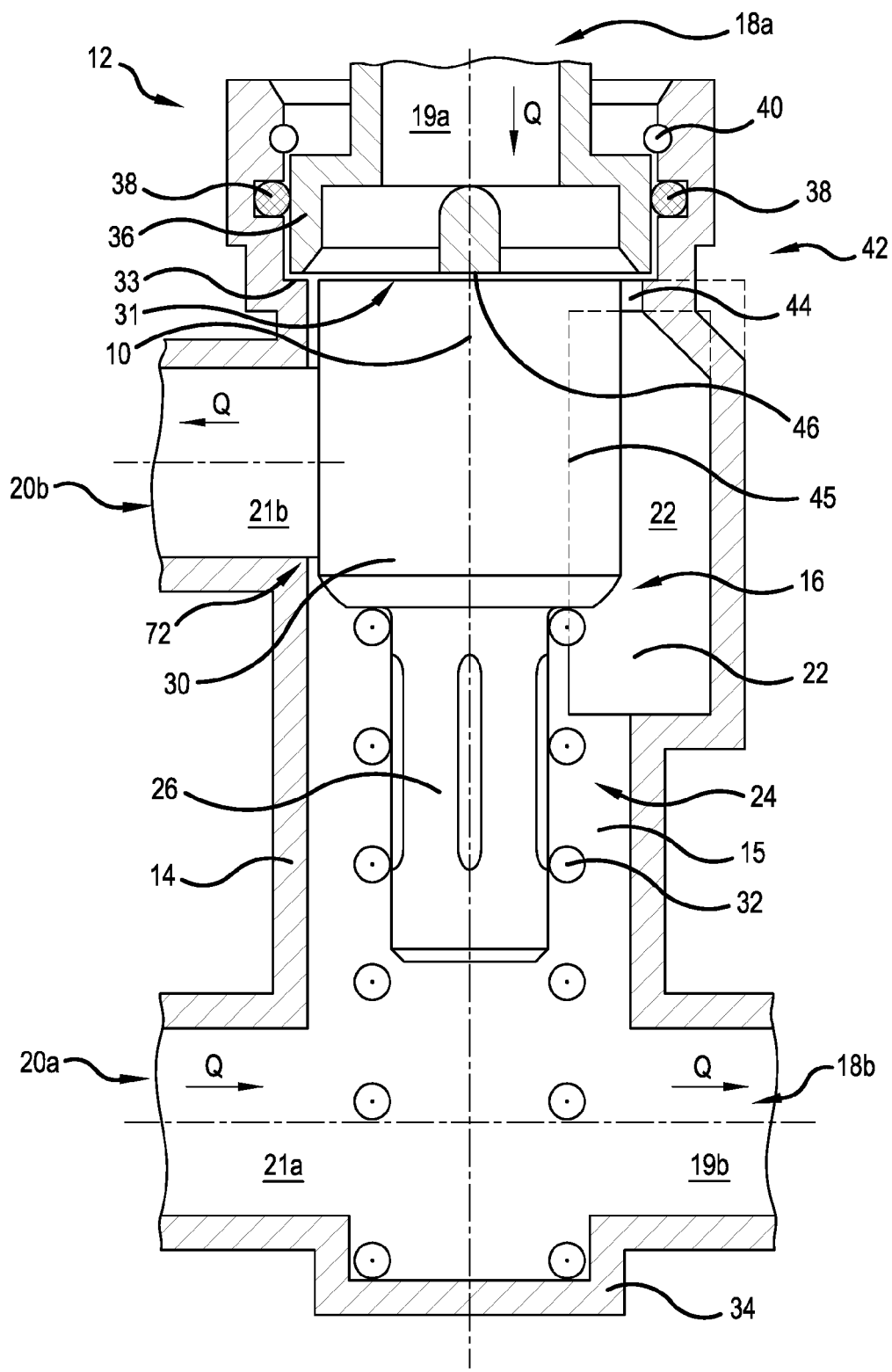
FIG. 1 illustrates an embodiment of a thermostatic valve in a first position with a travel of 0 mm.

FIG. 1 shows a thermostatic valve 12 in a schematic sectional view along the central axis 10 with a one-piece thermostatic valve housing 14 with a thermostatic working element 16 arranged in an intake opening 15. The thermostatic valve 12 is shown in an idle mode and shows a travel of 0 mm. The thermostatic valve 12 is can be designed as a 4/2 directional valve and has a first inlet connection 18a to a first inlet port 19a and a second inlet connection 20a to a second inlet port 21a for a medium, for example, a fluid, which can flow into the thermostatic valve 12 coming from a heat source. Furthermore the thermostatic valve 12 has a first outlet connection 18b to a first outlet port 19b, and a second outlet connection 20b to a second outlet port 21b for the medium, for example, fluid. The flow of the medium (inlet medium flow, outlet medium flow) is marked each with a "Q" and an arrow indicating the direction. The connections 18a and 18b can be connected with an installation representing a heat source, for example a gear drive (not shown). The second connections 20a and 20b can be connected with a heat exchanger (not shown). The heat exchanger can be an oil/air cooler or an oil/water cooler, particularly a gearbox oil cooler. The heat exchanger removes the heat from the medium, for example, the fluid, in particular the oil, and releases it to another medium which can be air or another fluid, for example water or another liquid coolant.

The thermostatic valve 12 has a bypass port 22 which can short-circuit the inlet port 19a with the outlet port 19b so that the medium, after flowing into the thermostatic valve 12 through the inlet port 18a without passing the heat exchanger, can flow again through the outlet port 21b and the outlet port 19b as well as the outlet connection 18b into the device representing the heat source.

The working element 16 has an expansion element 24 whereas the volume of an expansion material, provided in a bushing 26 of the expansion material 24, changes during a temperature change of the environment of the expansion element 24. The expansion element 24 can have a wax element as expansion material which can increase its volume during an increase in temperature based on an existing ambient temperature, and can again decrease its volume when the temperature drops. However, the expansion material can also be another material, for example paraffin or oil, which reacts with a volume change when the temperature changes. The expansion element 24 is connected to a piston 28 which is arranged primarily parallel to the central axis 10. The expansion element 24 also has a cap piece 30 which is moveable relative to the piston 28 and whose position is axially moveable along the central axis 10 in the housing 14, whereby its axial position in the thermostatic valve 12 can be changed. A spring element 32 is axially arranged between the cap piece 30 and a lower housing section 34 radially surrounding the bushing 26 and can serve as a return spring for the expansion element 24. The cap piece 30 and the bushing 26 are rigidly connected with each other and axially moveable relative to the piston 28 whereas the cap piece 30 based on an idle position is moveable axially in the direction of the housing section 34 during a volume change of the expansion material and the spring element 32 is compressed. In an idle position the spring element 32 presses the cap piece 30 into the idle position so that a cap piece end 31 is flush with a housing ledge 33 of the thermostat housing.

Axially opposite the housing section 34 is a housing element 36 provided in the thermostat housing 14 which is connected with the housing 14 through a sealing element 38. The sealing element 38 can be, for example, an O-ring which creates a fluid tight connection between the housing element 36 and the thermostat housing 14. The housing element 36 is secured with a retaining element 40, for example a tension ring in its position relative to the thermostat housing 14. The inlet connection 18a is constructed on the housing element 36. On the inside of a thermostatic valve housing section 42 a groove 44 is constructed which forms a restriction element 46 for the medium flow Q entering into the thermostatic valve 12. The groove 44 extends along the internal circumference of the housing section 42 in sections axially viewed at the same height as the ledge 33. The restriction element 46 is integrated into the thermostatic valve 12 through the groove 44 provided in the thermostat housing 14. With that, the restriction element 46 is a separate restriction element 46, independent of the working element 16. In particular, the restriction element 46 and the working element 16 are not mechanically connected. The restriction element 46 can be statically constructed in the thermostat housing 14 and is not moveable. The groove 44 facilitates the incoming medium flow Q such that it can flow into the bypass port 22 and from the bypass port 22 to the first outlet connection 18b and thus directly back to the heat source without having passed the heat exchanger. In doing so an increased loss in pressure can be equalized for a medium flow with low medium temperature.

With a thermostatic valve 12 opened only partially, a mixed mode can be facilitated where a part of the medium flow can pass through the bypass port 22 and a part via the outlet connection 20b into and via the heat exchanger.

A dashed line 45 shows a regular travel of 10 mm with an opened thermostatic valve 12 where the cap piece 30 of the working element 16 is axially displaced by 10 mm in the direction of the housing section 34 and the outlet connection 20b is released and, with that, opened so that the medium can flow to the heat exchanger. This is preferably the case for a high medium temperature.

Figure 2:
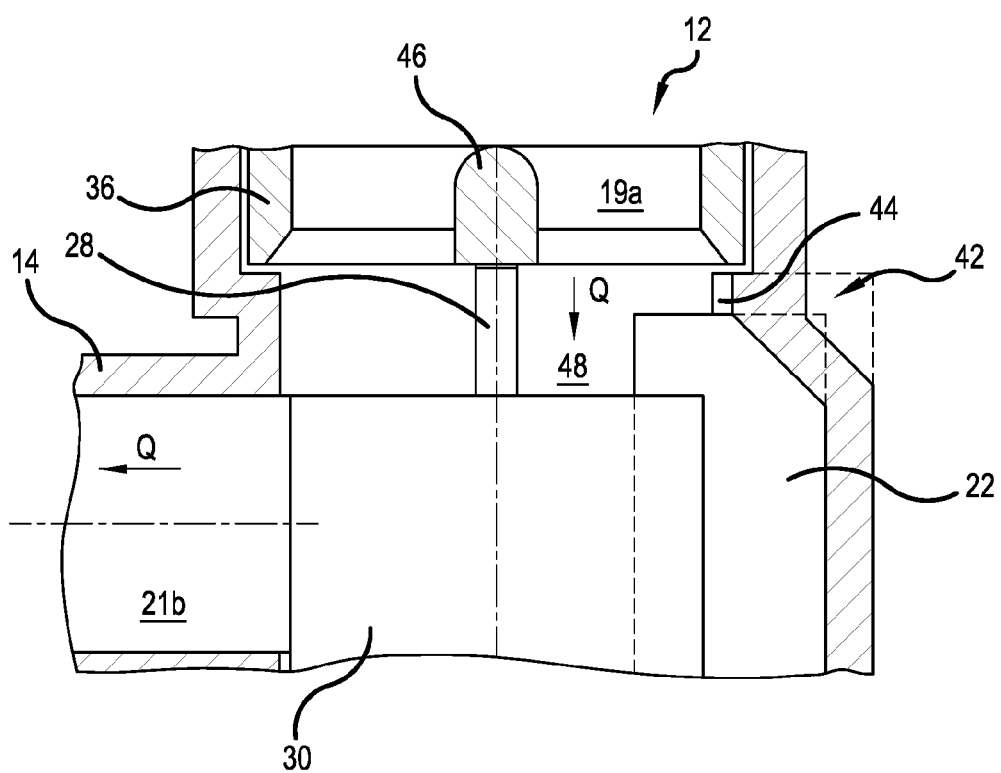
FIG. 2 illustrates a section of the thermostatic valve from FIG. 1 in another position with a travel of 3 mm.

In FIG. 2 the thermostatic valve 12 is shown schematically in a partially opened state in a sectional view. The travel is 3 mm. The piston 28 is extended due to the enlarged expansion element 24 and pushes against the restriction element 46, displacing the cap piece 30 axially into the direction of the housing section 34 and an enlarged opening 48 is created to the bypass port 22. With a travel of 3 mm the outlet connection 20b is still closed.

Figure 3:
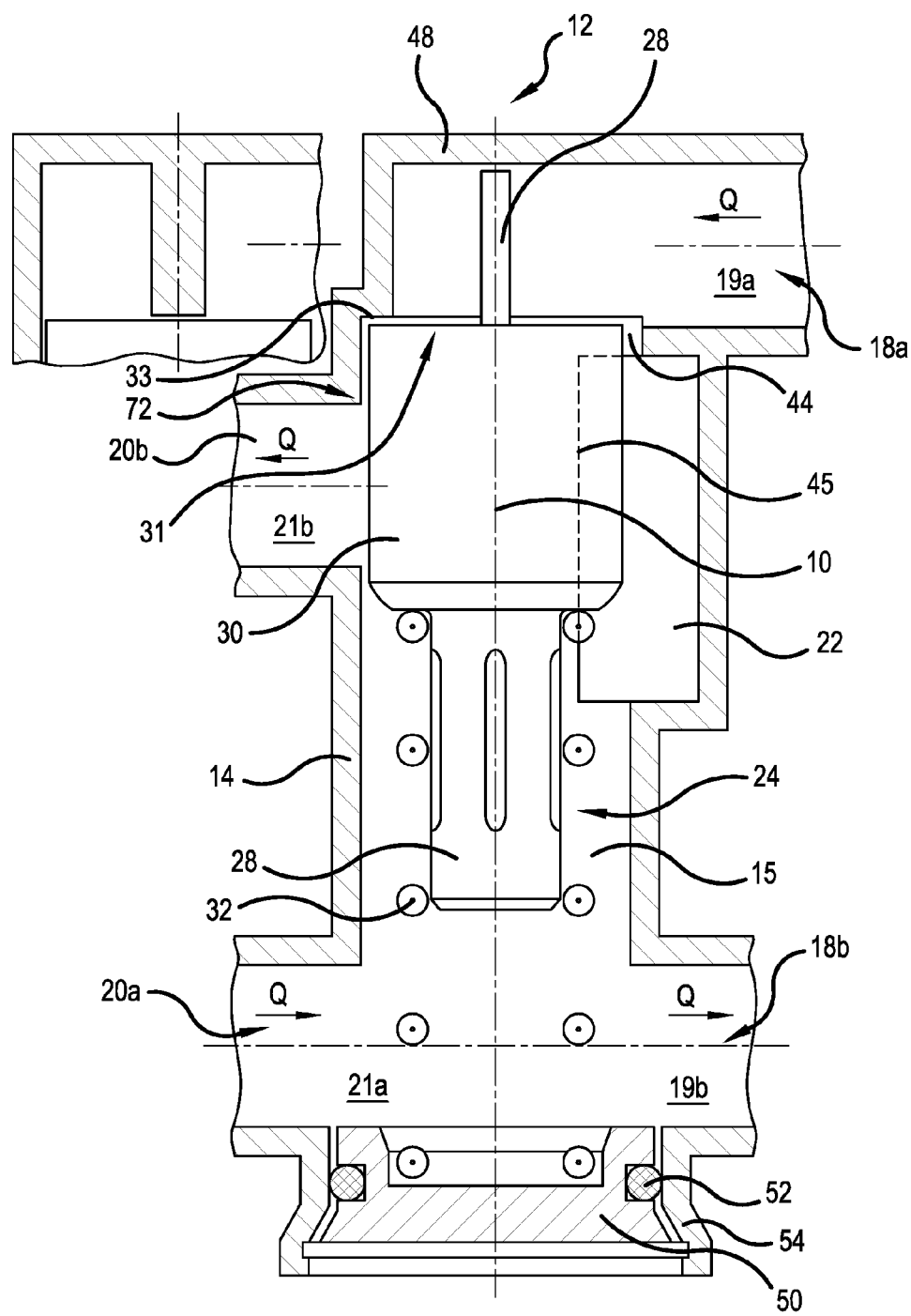
FIG. 3 illustrates an embodiment of a thermostatic valve in a sectional view.

FIG. 3 shows a sectional view along the central axis 10 of the thermostatic valve 12 which has an inlet connection 18a on the side of the thermostat housing 14 for the medium coming from the heating source. In the following description only the objects and functions are described that are different from the thermostatic valve 12 described in FIG. 1. Due to the inlet connection 18a arranged on the side, a housing section 48 of the housing 14 serves as a counter surface for the piston 28 which is arranged axially opposite the cap piece section 31. The counter surface for the spring element 32, particularly the return spring 32, is a housing element 50 which is connected fluid tight with a sealing element 52, for example, an O-ring, with a housing section 54. The housing element 50 as well as the housing element 36 is removable from the thermostatic valve housing 14, so that an opening can be generated through which the partial elements of the thermostatic valve 12 can be brought into the thermostatic valve housing 14 or defective parts can be exchanged. Such an opening is advantageous when the thermostatic valve housing 14 is formed of one piece, for example if it is made of injection molding. A power discharge element is realized through the dimensioning of the ledge 33 in relation to the idle position of the cap piece 30 of the working element 16.

Figure 4:
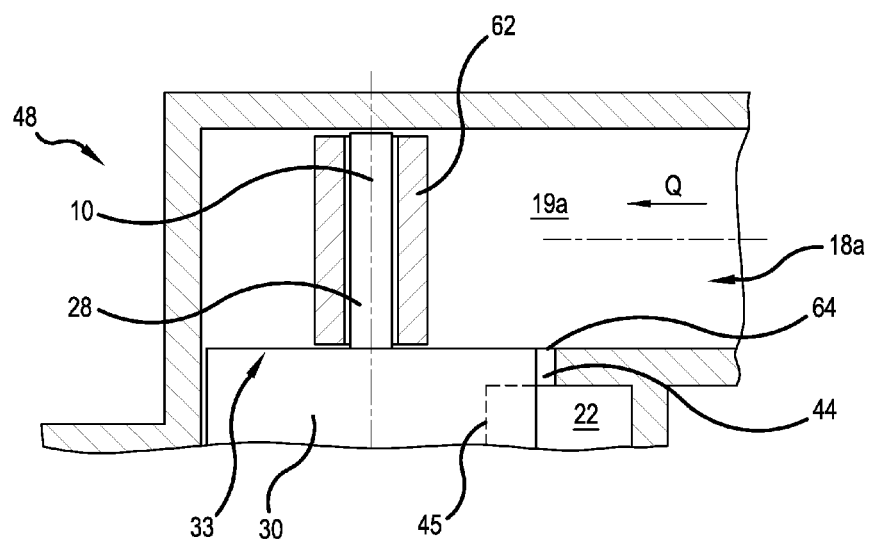
FIG. 4 illustrates an embodiment of a section of the thermostatic valve of FIG. 3.

FIG. 4 shows in a sectional view along the central axis 10 another embodiment of the upper housing section 48 of the thermostatic valve housing 14 of the thermostatic valve 12 of FIG. 3. The ledge 33 is not developed, but it is a straight housing wall, primarily running perpendicular to the central axis 10. A piston bushing 62 is provided around the piston 28, whereas the piston 28 is axially moveable in the piston bushing 62. The piston bushing 62 defines the distance between the upper housing section 48 and the cap piece 30 of the working element 16 and, with that, defines an upper catch position in idle position, to wit, at a travel of 0 mm, where the cap piece 30 is flush with an upper groove section 64.

Figure 5:
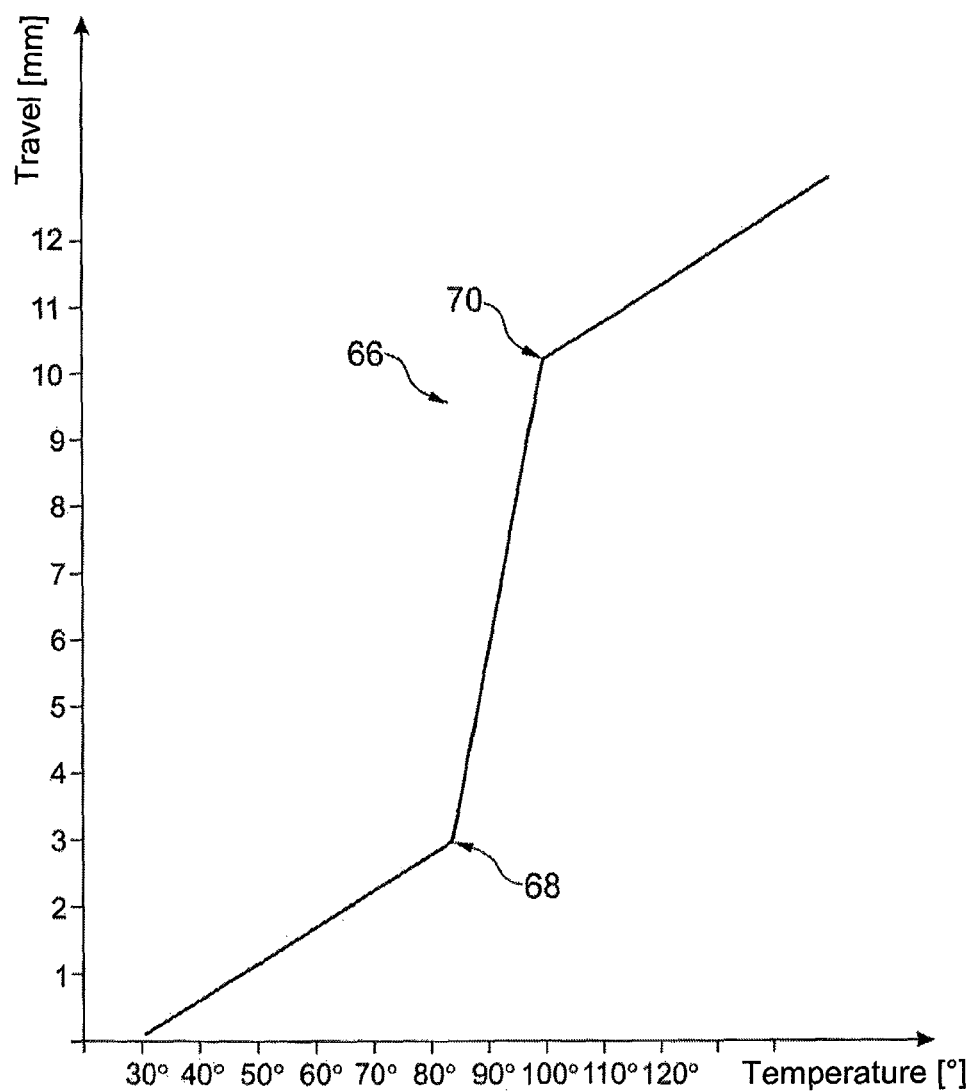
FIG. 5 is a diagram of a travel temperature characteristic curve for the thermostatic valve in accordance with the invention.

FIG. 5 shows a diagram of a travel temperature characteristic curve 66 where the temperature is shown on the x-axis and the travel of the working element 16 on the y-axis. Initially, the characteristic curve 66 runs in a temperature range between 30° C. and 80° C. with a linear slope, at 80° C. a travel of 3 mm can be achieved. At 80° C. the characteristic curve shows a knee 68 at which the outlet port 21b is opened in the direction of the heat exchanger. In a temperature range between 80° C. and 95° C. the characteristic curve 66 continues very steep, and a travel of 10.5 mm can be achieved at 95° C. After a second knee the characteristic curve 66 runs flatter again at temperatures greater than 95° C. and shows a smaller slope, approximately corresponding to the slope of the first characteristic curve section below the knee 68.

In the temperature range between the knee 68 and the knee 70 the thermostatic valve 12 is open and the outlet port 21b is cleared [and] the medium can flow into the heat exchanger.

In the following the function of the thermostatic valve 12 is briefly described during an increasing temperature of the medium, for example the transmission fluid. At a point in time t=0 the medium has a certain temperature, typically about 30° or lower. The thermostatic valve 12 is in its idle position. When the temperature of the medium flowing through the inlet connection 18a of the thermostatic valve 12 rises, the expansion material of the expansion element 24 will expand, in particular it will increaseits volume. This displaces the bushing 26 and the cap piece 30 axially in the direction of the housing section 34 or 54 (depending on the embodiment). The piston 28 pushes against the housing section 36, 48 and the expansion element 24 shifts axially in the opposite direction. The cap piece 30 is displaced parallel to the housing wall of the housing 14 in the direction of the control edge 72. This happens slowly in accordance with the temperature travel characteristic curve 66. Due to the separate restriction element 46 and the opening realized through the groove 44 the small cleared opening 48 through which the medium can flow, initially defined only by the groove 44, will become increasingly larger. However, the medium can still not flow into the outlet connection 20b since the cap piece 30 has not yet passed the control edge 72. Consequently, the medium can flow only into the bypass port 22 and from there directly back into the heating source through the outlet connection 18b. In doing so, a loss in pressure is generated through the medium flow due to the small opening of the groove 44.

After the knee 68 in the characteristic curve, that is from a temperature of 80° C. on, the relative travel change of the working element 16 becomes greater and the outlet connection 20b is cleared at least in part, the medium can flow at least partially into the heat exchanger, is cooled there and can flow back again to the heat source through the inlet connection 20a into the thermostatic valve 12. Another portion of the medium, however, will continue to flow through the bypass port 22 to the outlet connection 18b until the outlet connection 20b is completely open. This operational state is defined as mixed mode.

If the temperature continues to rise—at temperatures greater than 95° C.—the entire medium flow will take place via the heat exchanger and back to the heat source, since the outlet connection 20b to the heat source is opened completely and the bypass port 22 is closed.

Therefore, the pressure in the medium flow can be controlled and, if necessary, be reduced via the restriction element 46 with the preceding groove 44 in the thermostat housing 14.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A thermostatic valve to connect a heat source with a heat exchanger, the thermostatic valve comprising:
   a thermostatic valve housing having a first inlet connection for a first inlet port and a second inlet connection for a second inlet port and having a first outlet connection for a first outlet port and a second outlet connection for a second outlet port;
   a moveable working element adapted to open and close the first and second inlet ports and the first and second outlet ports, the moveable working element being arranged in an intake opening of the thermostatic valve housing;
   a separate restriction element arranged in the thermostatic valve housing between the first inlet connection and the first outlet connection; and
   a bypass port provided between the first inlet port and the first outlet port,
   wherein the restriction element has a recess or a groove arranged in the thermostatic valve housing,
   wherein the recess or the groove is provided on a same side of the thermostatic valve housing as the bypass port, and during any position of the moveable working element, the recess or the groove remains fluidly connected and open to the bypass port,
   wherein the restriction element is at least partially provided in and axially aligned with the first inlet port, and
   wherein an axial centerline of the first inlet connection is perpendicular to an axial centerline of the first outlet connection, an axial centerline of the second inlet connection and an axial centerline of the second outlet connection.

2. The thermostatic valve according to claim 1, wherein the restriction element is provided between the first inlet port and the bypass port.

3. The thermostatic valve according to claim 1, wherein the first inlet connection and the second outlet connection are arranged in an axial direction at a different height in the thermostatic valve housing.

4. The thermostatic valve according to claim 1, wherein the bypass port is closed when an upper temperature threshold value is reached or exceeded.

5. The thermostatic valve according to claim 1, wherein a cap piece of the working element is loaded with a spring element that forces the working element into a position where the connection between the bypass port and the first outlet port is open.

6. A cooling system for a motor vehicle with a cooling circuit and a heat source, particularly a gear drive, and at least one heat exchanger, wherein a thermostatic valve according to claim 1 connects the heat source to the heat exchanger.

7. The cooling system according to claim 6, wherein the heat exchanger is constructed as an oil/air cooler or an oil/water cooler.

8. The thermostatic valve according to claim 1, wherein the heat source is a gear drive and wherein the heat exchanger is a motor vehicle heat exchanger.

9. The thermostatic valve according to claim 1, wherein the recess or the groove is smaller in cross-section than the bypass port.

10. The thermostatic valve according to claim 1, wherein the first inlet port is provided as a separate housing element that is inserted into the thermostatic valve housing and is sealed to the thermostatic valve housing via a sealing element.

11. The thermostatic valve according to claim 3, wherein the axial centerline of the first outlet connection and the axial centerline of the second inlet connection are aligned and extend perpendicular to an axial centerline of the working element, such that, in an axial direction of the working element, the first outlet connection and the second inlet connection are arranged at a same height in the thermostatic valve housing, and wherein the first outlet connection and the second inlet connection are arranged at a lower housing section of the thermostatic valve housing, the lower housing section being where a spring element is attached to the thermostatic valve housing.

12. The thermostatic valve according to claim 1, wherein the bypass port protrudes from an exterior side surface of the thermostatic valve housing.

* * * * *